(12) United States Patent
Caillard et al.

(10) Patent No.: US 9,809,252 B2
(45) Date of Patent: Nov. 7, 2017

(54) REAR STRUCTURE OF A MOTOR VEHICLE

(71) Applicant: RENAULT s.a.s., Boulogne Billancourt (FR)

(72) Inventors: Jerome Caillard, Gif sur Yvette (FR); Thierry Hlubina, Chaville (FR); Olivier Rioult, Voisins le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 0 days.

(21) Appl. No.: 15/126,815

(22) PCT Filed: Feb. 9, 2015

(86) PCT No.: PCT/FR2015/050297
§ 371 (c)(1),
(2) Date: Sep. 16, 2016

(87) PCT Pub. No.: WO2015/140425
PCT Pub. Date: Sep. 24, 2015

(65) Prior Publication Data
US 2017/0088177 A1    Mar. 30, 2017

(30) Foreign Application Priority Data
Mar. 18, 2014    (FR) ..................... 14 52230

(51) Int. Cl.
*B62D 21/00*    (2006.01)
*B62D 21/11*    (2006.01)
(Continued)

(52) U.S. Cl.
CPC ............... *B62D 21/11* (2013.01); *B60G 9/02* (2013.01); *B60K 7/00* (2013.01); *B62D 25/08* (2013.01);
(Continued)

(58) Field of Classification Search
CPC ................................ B62D 21/00; B62D 21/11
See application file for complete search history.

(56) References Cited

U.S. PATENT DOCUMENTS

| | | | | |
|---|---|---|---|---|
| 6,705,667 B1 * | 3/2004 | Bartesch | ................ | B62D 21/10 296/181.7 |
| 7,828,370 B2 * | 11/2010 | Ohi | ........................ | B62D 25/20 296/187.08 |
| 2010/0072786 A1 * | 3/2010 | Koyama | ............ | B62D 25/2027 296/203.04 |

FOREIGN PATENT DOCUMENTS

| | | |
|---|---|---|
| DE | 10 2009 041 702 A1 | 4/2010 |
| DE | 10 2011 018 406 A1 | 4/2012 |

(Continued)

OTHER PUBLICATIONS

International Search Report dated May 19, 2015 in PCT/FR2015/050297 filed Feb. 9, 2015.

(Continued)

*Primary Examiner* — John Walters
*Assistant Examiner* — James Triggs
(74) *Attorney, Agent, or Firm* — Oblon, McClelland, Maier & Neustadt, L.L.P.

(57) ABSTRACT

A motor vehicle rear structure includes an underframe component to support a motor vehicle floor and in which a tunnel is formed, an axle component including a central part and two lateral parts that define a space to accommodate a component of the vehicle, an articulation device including a first articulation element and a second articulation element which are able to pivot relative to one another, and at least one front reinforcing element fixed to the second articulation element and to the tunnel. The rear structure is arranged in such a way that said at least one front reinforcing element allows at least some of a load in the direction of travel of the motor vehicle derived from the axle component to be transmitted to the tunnel.

9 Claims, 2 Drawing Sheets

(51) Int. Cl.
*B62D 25/20* (2006.01)
*B60G 9/02* (2006.01)
*B60K 7/00* (2006.01)
*B62D 25/08* (2006.01)

(52) U.S. Cl.
CPC .... *B62D 25/2027* (2013.01); *B60G 2204/143* (2013.01); *B60K 2007/0046* (2013.01); *B60Y 2304/01* (2013.01)

(56) References Cited

FOREIGN PATENT DOCUMENTS

EP 0 560 242 A1 9/1993
GB 2 056 382 A 3/1981

OTHER PUBLICATIONS

French Search Report dated Nov. 11, 2014 in FR 1452230 filed Mar. 18, 2014.

\* cited by examiner

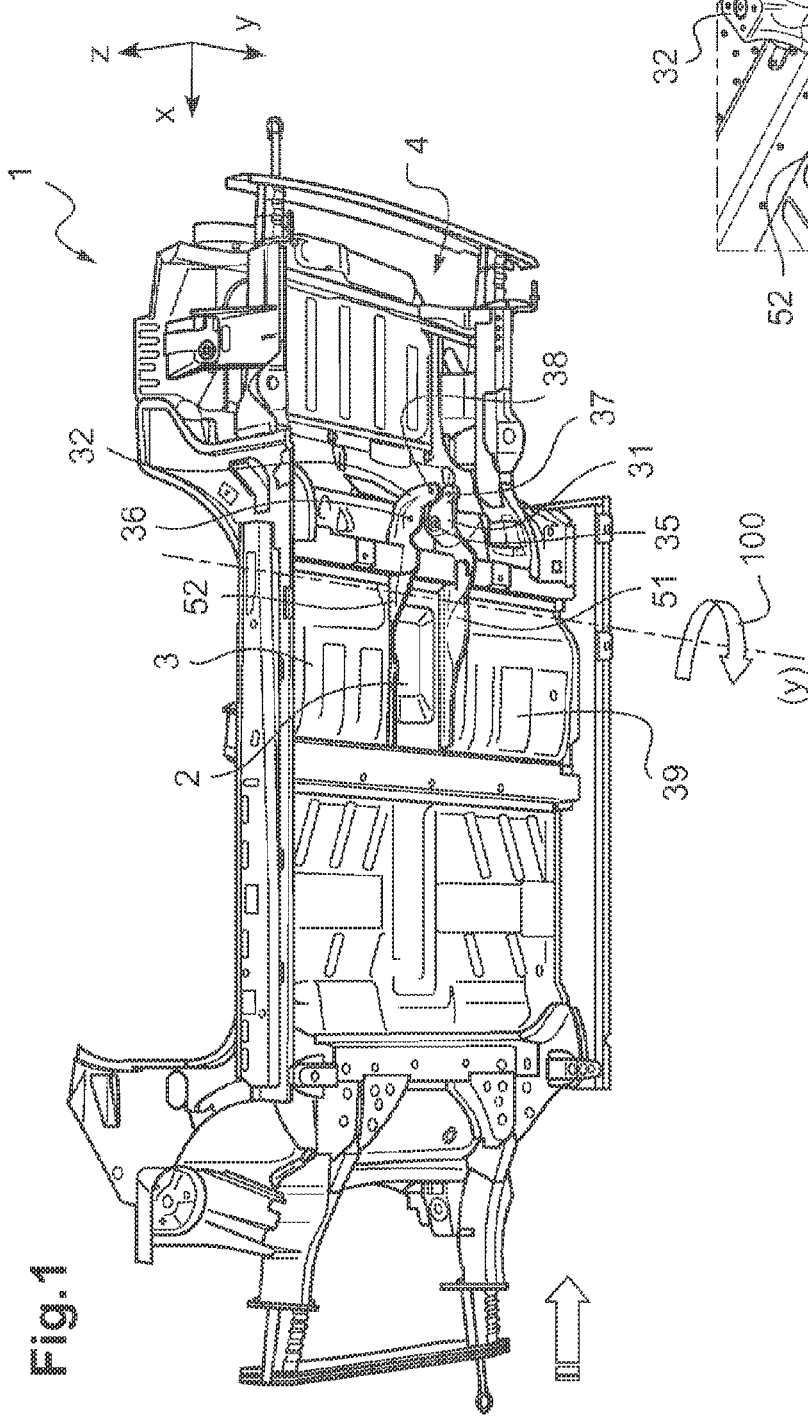
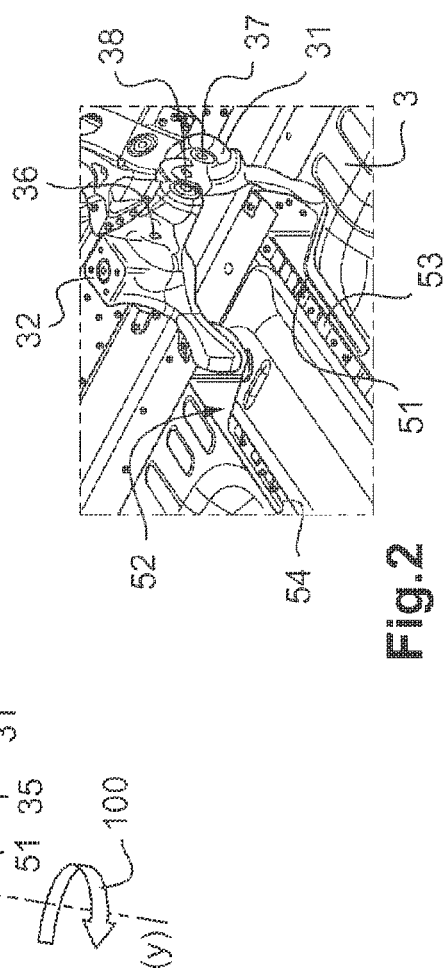
Fig. 1
Fig. 2

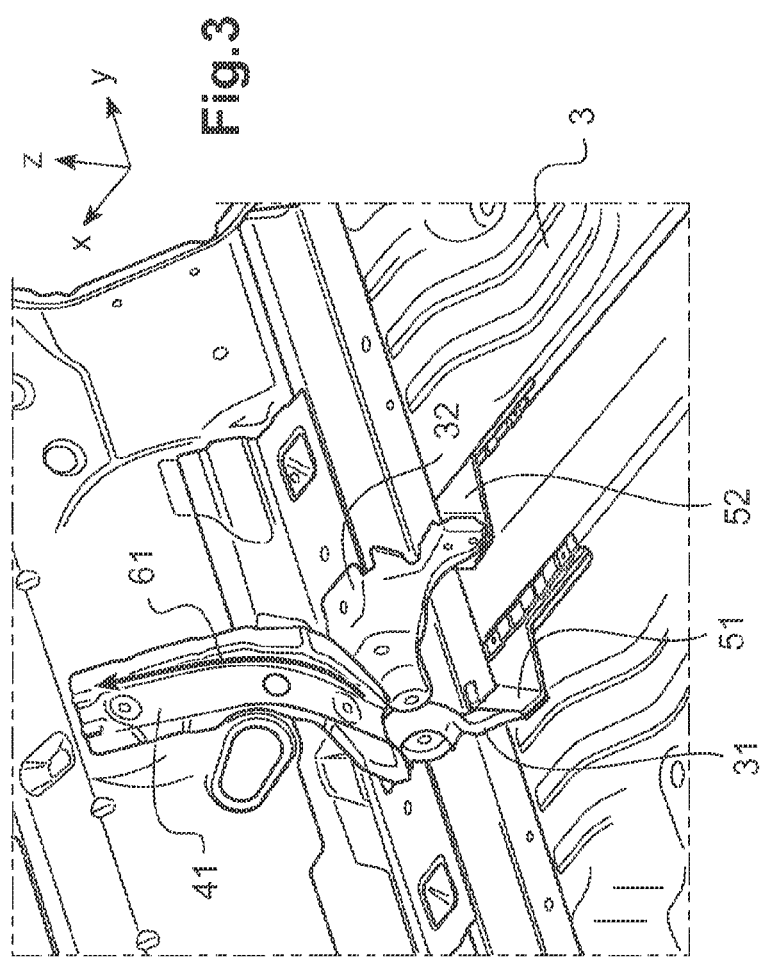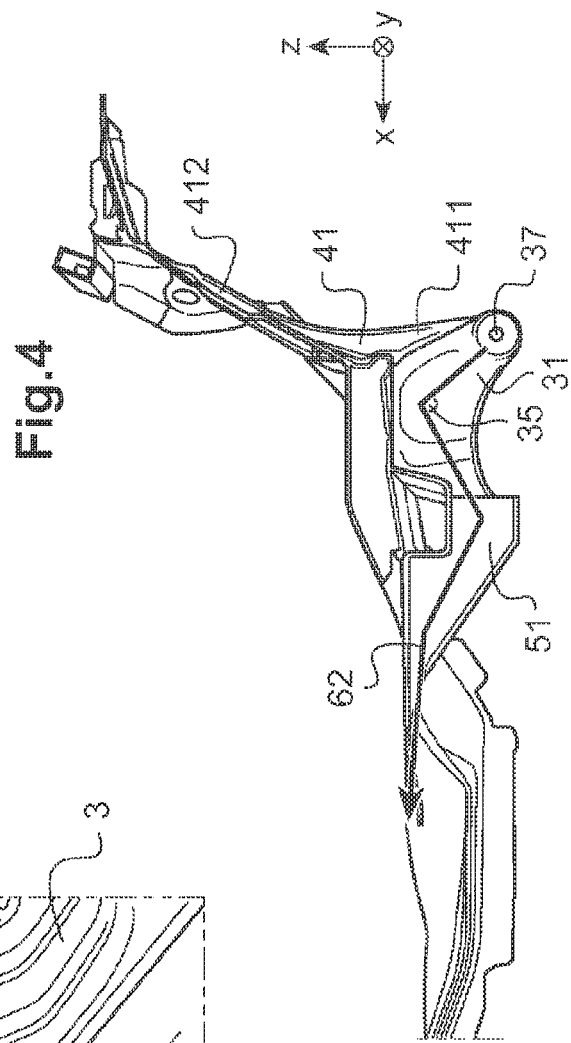

REAR STRUCTURE OF A MOTOR VEHICLE

The invention relates to a motor vehicle rear structure comprising an axle component with central fixing.

Vehicles provided with a rear structure comprising an axle component with central fixing, for example a de Dion axle, pivot-mounted about an axis y, are known, this axis being horizontal and perpendicular to the direction of travel in the frame of reference of the vehicle. A bearing may thus allow the axle component to rotate in y in order to compensate for any deficiencies in the flatness of the ground and/or to absorb stresses induced in a frontal impact.

An axle component with central fixing may allow a more compact design of vehicle than an H-shaped axle component.

The element articulated to the axle for this rotation in y may be capable of absorbing relatively high load in the direction of travel of the vehicle (load in x), notably in the event of sudden braking or of a collision. There is therefore a risk of breakage; in particular, a cross member may be liable to become detached relatively easily.

There is therefore still a need for a more robust rear structure.

There is proposed a motor vehicle rear structure comprising:
- an underframe component for supporting a motor vehicle floor and in which a tunnel is formed,
- an axle component comprising a central part and, on each side of the central part, two lateral parts defining, with the central part, a space to accommodate a component of the vehicle, for example an engine,
- an articulation device comprising a first articulation element and a second articulation element which are able to pivot relative to one another, the first articulation element being directly or indirectly fixed to or integrated into the central part of the axle component and the second articulation element being directly or indirectly fixed to or integrated into the underframe component, the rear structure being arranged in such a way that the first and second articulation elements are able to pivot relative to one another about an axis that is substantially horizontal and substantially perpendicular to the direction of travel of the vehicle in the frame of reference of the motor vehicle, when the first and second articulation elements are thus fixed to or integrated into the central part of the axle component and the underframe component of the motor vehicle, respectively,
- at least one front reinforcing element fixed on the one hand to the second articulation element and, on the other hand, to the tunnel, the rear structure being arranged in such a way that said at least one front reinforcing element allows at least some of the load in the direction of travel of the motor vehicle derived from the axle component to be transmitted to the tunnel.

Thus, load can be better distributed than in the prior art, such that the risk of the articulation device becoming detached from the underframe component is reduced. This rear structure thus makes it possible to create a motor vehicle with a centrally fixed axle component that is more reliable than in the prior art, and also relatively lightweight.

The axle component may for example comprise a de Dion axle, or the like.

The tunnel may be designed to transmit relatively high load toward the front of the vehicle.

In particular, the tunnel may be relatively straight, may have an inverse U-section, may be produced by roll forming and/or may be made from a material with a high elastic limit.

The tunnel may be shaped in such a way as to define a passage for one or several elongate elements, for example for a transmission shaft or, alternatively, for cables.

The tunnel may accommodate elements fixed to the center of the motor vehicle, for example sensors, a gearshift lever, a handbrake.

The tunnel constitutes a path for transmitting longitudinal load. The tunnel may for this purpose extend longitudinally in a straight line and be arranged in the vehicle in such a way as to extend in the direction of the longitudinal load (axis x).

The tunnel may, with the floor, form a hollow body.

The invention also finds a particularly advantageous application in the case of rear-engined vehicles, because the front reinforcing element(s) may then make it possible to spread load that is likely to be relatively high.

The vehicle component accommodated in the space defined by the axle component may thus comprise a rear engine, for example a propulsion engine, or indeed some other component.

Nevertheless, it is entirely possible to use the invention for a front-engined vehicle.

The second articulation element may be directly fixed to or integrated into the underframe component, which means to say that the axle component is rotationally mounted directly on the underframe component, without a cradle. The invention finds a particularly advantageous application when the axle component is rotationally mounted directly on the underframe component, because distribution of load may be trickier than when a cradle is provided.

Alternatively, the rear structure may comprise a cradle between the underframe component and the second articulation element.

The invention is not restricted to one particular form of articulation device. The first articulation element may comprise a shaft and the second articulation element may comprise a bearing collaborating with this shaft, or vice versa. The bearing may for example comprise a tubular bearing bush which may or may not be flanged. It is also possible to contemplate rotational guidance using rolling bearings. The articulation device may, for example, comprise a ball bearing.

Advantageously and nonlimitingly, the second articulation element may comprise at least one flange, for example two flanges, integrated into the underframe component. Stated differently, the underframe component may comprise an underframe part in which the tunnel is formed, and at least one flange which (possibly with other components) forms the second articulation element.

In one advantageous embodiment, the flange(s) may be obtained by pressing. The underframe component may thus be relatively easy to manufacture. For example, it is possible to contemplate welding the flange(s) to the underframe part.

When the second articulation element comprises two flanges facing one another, this second element may for example further comprise a rod inserted rigidly into two respective recesses of the flanges, and held in place for example using a nut.

The first articulation element may for example comprise a ring rotationally mounted around this rod and secured to the central part of the component of the axle.

The first articulation element may comprise an additional ring mounted around the central part of the axle component and of one piece with the ring that is mounted around the rod.

The articulation elements thus may or may not be made as a single piece.

Advantageously and nonlimitingly, the front reinforcing element(s) may be obtained by pressing.

The front reinforcing elements are thus relatively easy to manufacture.

The front reinforcing elements may be fixed to the underframe component and the second articulation element, for example by welding, screwing or some other means.

Advantageously and nonlimitingly, the rear structure may further comprise at least one rear reinforcing element, also referred to as a rib, fixed to the second articulation element on the one hand, and on the other hand to the underframe component, the rear structure being arranged so that said at least one rear reinforcing element allows at least some of the vertical load derived from the axle component to be transmitted to the underframe component.

The rear reinforcing element(s) may have a curved shape, one portion of curve resting on the articulation device and another portion of the curve, opposite to the portion that is resting on the articulation device, resting on the underframe component.

The rear reinforcing element(s) may advantageously be obtained by pressing.

The rear reinforcing element(s) may advantageously be welded to the second articulation element and to the underframe component.

Advantageously and nonlimitingly, the second articulation element and the front reinforcing element may be arranged relative to one another so that they are substantially aligned in the axis x of direction of travel of the vehicle. Load in x is thus relatively well transmitted from the articulation device to the front reinforcing element.

Advantageously and nonlimitingly, the rear reinforcing element and the second articulation element are arranged relative to one another so that they are substantially aligned in a vertical direction in the frame of reference of the vehicle (axis z). Vertical load may thus be relatively well transmitted from the rear reinforcing element to the underframe component.

Also proposed is a motor vehicle comprising a rear structure as described hereinabove.

The invention will be better understood with reference to the figures which illustrate embodiments given by way of nonlimiting example.

FIG. 1 is a perspective view of the rear part of a motor vehicle according to one embodiment, some components, notably the rear axle component, not having been depicted.

FIG. 2 is a perspective view of a portion of rear structure according to the embodiment of FIG. 1, certain components not having been depicted.

FIG. 3 is a perspective view of part of a rear structure according to one embodiment of the invention.

FIG. 4 is a perspective view in cross section, along the axis y, of part of a rear structure, according to one embodiment of the invention.

From one figure to another, identical references will be used to denote elements that are identical or similar in shape or in function.

In the present application, the axes x, y, z are the axes conventionally used in the automotive field, considered in the frame of reference of the motor vehicle, which means to say that the axis x is the front-rear axis of the vehicle, corresponding to the direction of travel when the steering wheel is straight, that the axis z is colinear with the gravity vector and of opposite sense to this gravity vector when the vehicle is standing with its wheels on flat ground, and that the axis y, or lateral axis, is perpendicular to the axes x and z, the axes x, y, z forming an orthonormal frame of reference.

With reference to FIG. 1, a motor vehicle 1 comprises an underframe component 3 in which a tunnel 2 is formed.

The underframe component 3 comprises an underframe part 39, in which the tunnel 2 is formed, and two flanges 31, 32 welded to the underframe part 39.

These flanges 31, 32 are obtained from sheet metal, by pressing.

These flanges 31, 32 define two recesses 35, 36 facing one another and intended to accommodate a rod (not depicted) on which a ring (not depicted) secured to another ring (not depicted) is rotationally mounted, this other ring being mounted, rigidly or with the ability to rotate, on a central part of a central-fixing axle component which has not been depicted. The component (not depicted) incorporating these two rings forms a first articulation element.

The rod is rigid relative to the flanges 31, 32 and with these flanges forms a second articulation element. The second articulation element is therefore made in multiple components.

The first and second articulation elements are thus able to pivot relative to one another about an axis that is parallel or substantially parallel to the axis y of the vehicle.

The first articulation element is fixed to the axle component, not depicted, for example a de Dion axle, this axle component comprising a central part thus mounted articulated to the flanges 31, 32 and, on each side of this central part, two lateral parts. This axle component thus defines a space 4 to accept a propulsion engine, not depicted.

The flanges 31, 32 form, with the rod and the rings, an articulation device between the de Dion axle and the underframe component 3.

This articulation device allows pivoting about the axis y, this pivoting being depicted by the arrow 100.

In this embodiment, the articulation device is thus configured so that the de Dion axle is rotationally mounted directly on the underframe component 3, without a cradle.

The underframe component 3 therefore absorbs load derived from the de Dion axle, particularly load derived from the engine.

The flanges 31, 32 define two additional recesses 37, 38 to accommodate an additional rod (not depicted) on which an engine torque reacting link rod (not depicted) is mounted.

The flanges 31, 32 thus absorb a proportion of the load emanating from the engine.

The articulation device and the central part of the de Dion axle component thus constitute a relatively heavily loaded zone forming both a bearing for rotation in y and a support for transmitting other loadings, notably load along the axis x and/or the axis z, particularly in the event of a frontal impact.

Front reinforcing elements 51, 52 allow at least some of this load to be absorbed better. These front reinforcing elements 51, 52 are obtained from a metal sheet created by pressing.

These front reinforcing elements 51, 52 are, on the one hand, fixed to the respective flanges 31, 32 by welding. For this purpose, the flanges 31, 32 and the front reinforcing elements 51, 52 define welding surfaces intended to be joined together.

Moreover, the front reinforcing elements 51, 52 define additional welding surfaces 53, 54 (FIG. 2) for attachment by welding to the underframe component 3. As depicted in FIG. 2, the front reinforcing elements 51, 52 are thus welded on each side of the tunnel 2.

The front reinforcing elements 51, 52 may thus make it possible to transmit to the tunnel 2 any load coming from the bearing zone, which means to say from the central part of the de Dion axle and from the flanges 31, 32, onto the walls of the tunnel 2. Because the tunnel 2 is a relatively strong element, this load can thus be absorbed with a limited risk of breakage.

These front reinforcing elements 51, 52 thus allow reliability of the vehicle to be reconciled with lightness of weight.

These front reinforcing elements 51, 52 may make it possible to absorb load derived from the engine in the event of a rear impact, but also in the event of a frontal impact, the engine then constituting a pressing mass. Stated differently, the front reinforcing elements 51, 52 make it possible to improve inertance of axis x.

With reference to FIGS. 3 and 4, which will be discussed simultaneously, the motor vehicle rear structure further comprises a rear reinforcing element or rib 41.

The rear reinforcing element 41 is fixed to the flanges 31, 32, for example by welding.

The rear reinforcing element 41 has a relatively curved shape, one part 411 of the curve being welded to the flanges 31, 32, another part 412 of the element 41, opposite to the part 411, being welded to the underframe component 3.

This rib 41 thus in some way constitutes a kind of natural end stop for the engine in the event of an impact, and makes it possible to improve the transmission of vibration loadings in z.

These reinforcers 41, 51, 52 also provide this bearing zone with good endurance.

The central bearing of the rear axle fixing is thus reinforced, this reinforcement making it possible to compensate for rotation loadings around the bearing about the axis y.

As is evident from FIG. 4, the two assemblies formed by the respective front reinforcers, the corresponding flanges and the corresponding walls of the tunnel are each relatively aligned with the axis x of the vehicle thereby making it possible to ensure good transmission of load in x (arrow 62); and the assembly formed by the rear reinforcing element 41, the flanges and the ascending part of the underframe component, in contact with the rear reinforcing element, is relatively aligned with the axis z, thus allowing relatively good transmission of load in z, in the direction of the arrow referenced 61 in FIG. 3.

The reinforcers 51, 52 and 41 allow load to be transmitted, in the direction of the respective arrows 61, 62 in FIGS. 3 and 4, while at the same time limiting the constraining of the bearing flanges so as to allow suitable rotation about the axis y and not use up all of the screw tightening torque to bring the flanges closer together, when the axle component is being mounted and the bearing is being tightened onto the flanges.

The rear reinforcer 41 connects two zones that are relatively rigid and distant from one another with relatively low inertia on account of the proximity of the engine and the associated movements, and does so thanks to this relatively curved shape.

The tunnel 2 is produced by roll forming, from a material that has a high elastic limit, so as to transmit load to the rest of the motor vehicle.

The invention claimed is:

1. A motor vehicle rear structure, comprising:
   an underframe component to support a motor vehicle floor and in which a tunnel is formed;
   an axle component comprising a central part and, on each side of the central part, two lateral parts defining, with the central part, a space to accommodate a component of the vehicle;
   an articulation device comprising a first articulation element and a second articulation element which are able to pivot relative to one another, the first articulation element being fixed to or integrated into the central part of the axle component and the second articulation element being fixed to or integrated into the underframe component, the rear structure being arranged in such a way that the first and second articulation elements are able to pivot relative to one another about an axis that is substantially horizontal and substantially perpendicular to a direction of travel of the vehicle in a frame of reference of the motor vehicle, when the first and second articulation elements are thus fixed to or integrated into the central part of the axle component and to the underframe component of the motor vehicle, respectively; and
   at least one front reinforcing element fixed to the second articulation element and to the tunnel, the rear structure being arranged in such a way that said at least one front reinforcing element allows at least some of a load in the direction of travel of the motor vehicle derived from the axle component to be transmitted to the tunnel.

2. The motor vehicle rear structure as claimed in claim 1, in which the vehicle component accommodated in the space defined by the axle component comprises a rear engine.

3. The motor vehicle rear structure as claimed in claim 1, in which the second articulation element is directly fixed to or integrated into the underframe component.

4. The motor vehicle rear structure as claimed in claim 3, in which the second articulation element comprises two flanges integrated into the underframe component.

5. The motor vehicle rear structure as claimed in claim 1, in which said at least one front reinforcing element is obtained by pressing.

6. The motor vehicle rear structure as claimed in claim 1, in which the second articulation element and the front reinforcing element are arranged relative to one another so that they are substantially aligned in the direction of travel of the vehicle.

7. The motor vehicle rear structure as claimed in claim 1, further comprising
   at least one rear reinforcing element fixed to the second articulation element and to the underframe component, the rear structure being arranged so that said at least one rear reinforcing element allows at least some of a vertical load derived from the axle component to be transmitted to the underframe component.

8. The motor vehicle rear structure as claimed in claim 7, in which the rear reinforcing element and the second articulation element are arranged relative to one another so that they are substantially aligned in the vertical direction in the frame of reference of the vehicle.

9. A motor vehicle, comprising:
   the motor vehicle rear structure as claimed in claim 1.

* * * * *